US012623207B2

(12) United States Patent
Amrute et al.

(10) Patent No.: US 12,623,207 B2
(45) Date of Patent: May 12, 2026

(54) PROCESS FOR THE PREPARATION OF HIGH SURFACE AREA ALPHA ALUMINA AND THE USE THEREOF

(71) Applicant: STUDIENGESELLSCHAFT KOHLE MBH, Mülheim (DE)

(72) Inventors: Amol Amrute, Mülheim an der Ruhr (DE); Ferdi Schueth, Mülheim an der Ruhr (DE); Hannah Schreyer, Mannheim (DE)

(73) Assignee: STUDIENGESELLSCHAFT KOHLE MBH, Munich (DE)

( * ) Notice: Subject to any disclaimer, the term of this patent is extended or adjusted under 35 U.S.C. 154(b) by 733 days.

(21) Appl. No.: 17/426,391

(22) PCT Filed: Jan. 21, 2020

(86) PCT No.: PCT/EP2020/051445
§ 371 (c)(1),
(2) Date: Jul. 28, 2021

(87) PCT Pub. No.: WO2020/156891
PCT Pub. Date: Aug. 6, 2020

(65) Prior Publication Data
US 2022/0088571 A1 Mar. 24, 2022

(30) Foreign Application Priority Data

Jan. 29, 2019 (EP) ...................................... 19154220
Oct. 24, 2019 (DE) ..................... 10 2019 216 426.9

(51) Int. Cl.
*B01J 21/04* (2006.01)
*B01J 35/45* (2024.01)
(Continued)

(52) U.S. Cl.
CPC ............... *B01J 21/04* (2013.01); *B01J 35/45* (2024.01); *B01J 35/613* (2024.01); *B01J 35/615* (2024.01); *B01J 37/0036* (2013.01); *B01J 37/082* (2013.01); *C01F 7/441* (2013.01); *C01P 2002/72* (2013.01); *C01P 2002/88* (2013.01);
(Continued)

(58) Field of Classification Search
CPC . B01J 21/04; B01J 35/613; B01J 35/40; B01J 37/0036; B01J 37/082; C01F 7/441; C01P 2002/72; C01P 2002/88; C01P 2004/04; C01P 2004/64; C01P 2006/12
See application file for complete search history.

(56) References Cited

U.S. PATENT DOCUMENTS 5,641,469 A 6/1997 Garg et al.

FOREIGN PATENT DOCUMENTS

| CN | 102989459 | A | * | 3/2013 | |
| EP | 0279672 | A1 | * | 8/1988 | ............. C04B 35/10 |
| EP | 0 554 908 | A1 | | 8/1993 | |

OTHER PUBLICATIONS

"Grinding Mills" SWECO. < https://sweco.com/addinfo/Grinding-Mills.pdf> (2021) <Accessed Feb. 28, 2024>.*
(Continued)

*Primary Examiner* — Richard M Rump
(74) *Attorney, Agent, or Firm* — Norris McLaughlin, PA

(57) ABSTRACT

The present invention refers to a process for the preparation of a high surface area nanoparticulate alpha alumina.

1 Claim, 7 Drawing Sheets

Figure 1:
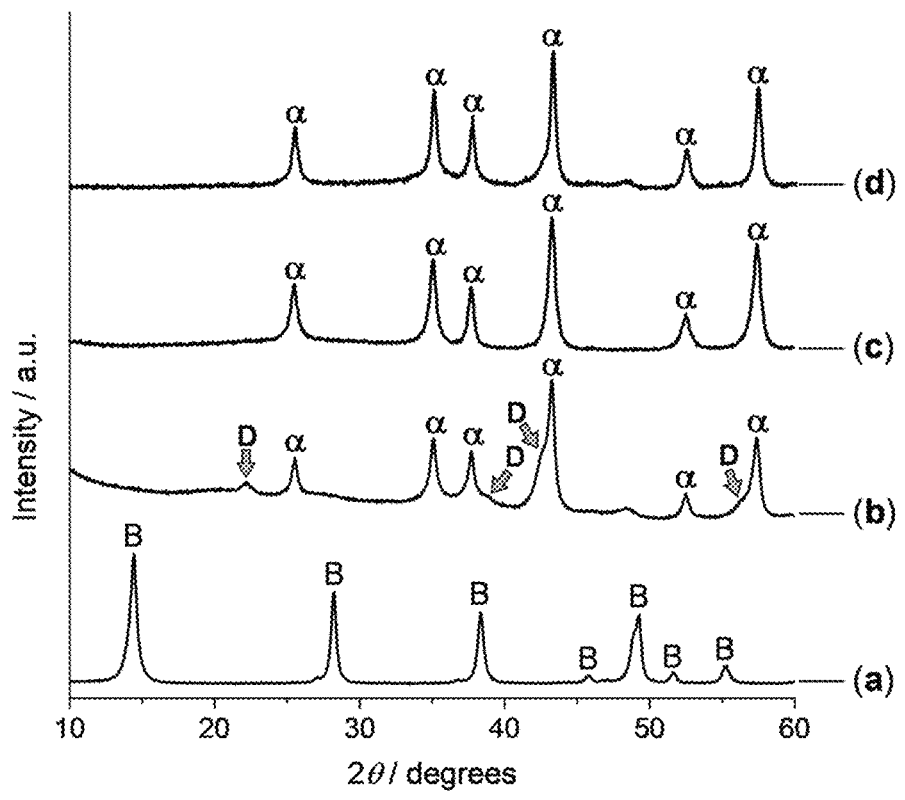

(51) Int. Cl.

| | |
|---|---|
| *B01J 35/61* | (2024.01) |
| *B01J 37/00* | (2006.01) |
| *B01J 37/08* | (2006.01) |
| *C01F 7/441* | (2022.01) |

(52) U.S. Cl.
CPC ...... *C01P 2004/04* (2013.01); *C01P 2004/64* (2013.01); *C01P 2006/12* (2013.01)

(56)  References Cited

OTHER PUBLICATIONS

Baláž, Peter, et al. "Hallmarks of mechanochemistry: from nanoparticles to technology." Chemical Society Reviews 42.18 (2013): 7571-7637.*

Tsuchida, Takeshi, and Kumi Horigome. "The effect of grinding on the thermal decomposition of alumina monohydrates, α-and β-Al2O3. H2O." Thermochimica Acta 254 (1995): 359-370.*

Kozawa, Takahiro, and Makio Naito. "Mechanically induced formation of metastable χ-and κ-Al2O3 from boehmite." Advanced Powder Technology 27.3 (2016): 935-939.*

Sezgiker, Korhan. Production of nano alumoxane from aluminum hydroxide. MS thesis. Middle East Technical University, 2010.*

Tsukada, Takayuki, et al. "Crystallinity of boehmite and its effect on the phase transition temperature of alumina." Journal of Materials Chemistry 9.2 (1999): 549-553.*

"Aluminum oxide" Wikipedia. <https://en.wikipedia.org/wiki/Aluminium_oxide> Archived version Feb. 2012 (Accessed Aug. 6, 2025).*

Cortes-Vega, et al.; "Room-temperature synthesis of Chi-Al2O3 and Ruby (alpha-Cr:Al2O3)", Crystengcomm., vol. 20, No. 25, pp. 3505-3511; 2018.

Ma, et al., "Synthesis and processing of nano-alpha-Al2O3 powders"; Titanium Powder Metallurgy and Additive manufacturing 4th International Conference on Titanium Powder Metallurgy & Additive Manufacturing: Selected, Peer Review Papers; vol. 206-2013; Sep. 2001; pp. 43-46.

Tonejc et al.; "Comparison of the transformation sequence from gamma-Al00H(Boehmite) to alpha-Al2O3 (corundum) induced by heating and by ball milling": Materials Science and Engineering; vol. 181-182; May 1994; pp. 1227-1231.

Tonejc et al.; "Equivalence of ball milling and thermal treatment for phase transitions in the Al2O3 system"; Journal of Alloys and Compounds, vol. 204, No. 1-2, Feb. 1994; pp. L1-L3.

\* cited by examiner

1

PROCESS FOR THE PREPARATION OF HIGH SURFACE AREA ALPHA ALUMINA AND THE USE THEREOF

This application is a 371 of PCT/EP2020/051445, filed Jan. 21, 2020, which claims foreign priority benefit under 35 U.S.C. § 119 of European Patent Application No. 19154220.8, filed Jan. 29, 2019; and German Patent Application No. 10 2019 216 426.9, filed Oct. 24, 2019, the disclosures of which are incorporated herein by reference.

The present invention refers to a process for the preparation of a high surface area nanoparticulate alpha alumina from boehmite Aluminium oxide is an important class of material with a wide range of technological applications, e.g. in ceramics, catalysis, skin-care and biomedical products, owing to its outstanding mechanical, chemical, electrical, and optical properties. Besides, alumina has a rich crystal chemistry due to its existence in seven crystallographic forms, namely, chi ($\chi$), kappa ($\kappa$), eta ($\eta$), gamma ($\gamma$), delta ($\delta$), theta ($\theta$), and alpha ($\alpha$). The first six forms are called as transition aluminas as they can be converted from one to another by annealing and the last one, called as corundum, is the thermodynamically most stable form of alumina. These aluminas are typically prepared by the thermal route which includes calcination of aluminum hydroxide ($Al(OH)_3$, commonly known as gibbsite, produced by Bayer process of bauxite refining) or oxide hydroxide ($\gamma$-AlOOH, called as boehmite) at different temperatures (Ivanova, Kinetics and Catalysis 2012, 53, 425-439) as stipulated in Equation 1

$$Al(OH)_3 \xrightarrow{\text{180-300 C.}} \gamma\text{-AlOOH} \xrightarrow{550°C.} \qquad\qquad \text{(Eq. 1)}$$
$$\gamma\text{-Al}_2O_3 \xrightarrow{850° C.} \delta\text{-Al}_2O_3 \xrightarrow{1050° C.} \theta\text{-Al}_2O_3 \xrightarrow{1200° C.} \alpha\text{-Al}_2O_3$$

The formation of transition aluminas in this route occurs via dehydration at mild-high temperature (i.e. up to 550° C.) to form $\gamma$-$Al_2O_3$, followed by the topotactic transformation of the latter to $\delta$-$Al_2O_3$ and $\theta$-$Al_2O_3$. Thus, transition aluminas, particularly gamma phase, generally possess a high specific surface area (70-150 m²/g) and are attractive for applications such as in catalysis and adsorption. However, they have poor hydrothermal stability. For example, $\gamma$-$Al_2O_3$ is widely applied as a catalyst support in Fischer-Tropsch catalyst formulation (Aad et al., ChemCatChem 2017, 9, 2106-2117). However, since water is produced as the byproduct of the Fischer-Tropsch synthesis process; it causes the hydration of $\gamma$-$Al_2O_3$ to form boehmite according to Equation 2:

$$\gamma\text{-Al}_2O_3 \rightarrow \gamma\text{-AlOOH} \qquad\qquad \text{(Eq. 2)}$$

This has an adverse effect on the catalyst and process stability. In contrast, corundum possesses an exceptional hydrothermal stability and can withstand the undesired hydration process, but it has a very low surface area because of its highly energy-uphill nucleation from transition alumina (Apparent activation energy=485 kJ/mol, Steiner et al. Journal of the American Ceramic Society 1971, 54, 412-413) requiring temperature above 1200° C., which leads to uncontrolled crystal growth owing to sintering (Shelleman et al., Journal of Non-Crystalline Solids 1986, 82, 277-285). The $\alpha$-$Al_2O_3$ materials obtained in such a way usually have a low surface area of <10 m²/g. Besides, the thermal route leads to vermicular microstructures of $\alpha$-$Al_2O_3$ which do not

2 achieve a full densification. This is critical for ceramic applications (Yarbrough et al., Journal of Materials Research 1987, 2, 494-515). Thus, it is intriguing to produce nanocrystalline $\alpha$-$Al_2O_3$ with a high surface area (>100 m²/g). This is only possible by reducing the formation temperature of the corundum phase.

A method known in the art involves the obtainment of corundum from diaspore ($\alpha$-AlOOH). The latter is a crystallographic polymorph of boehmite and has a hexagonal close packing of oxygen atoms, alike the $\alpha$-$Al_2O_3$ structure. Thus, this material can be transformed topotactically to corundum at a much lower temperature (500-600° C.) and thus can preserve high surface area (McHale et al., Science 1997, 277, 788-791; Perrotta et al., Materials Research Innovations 1998, 2, 33-38). However, the preparation of stable diaspore is very energy demanding (Yanagida and Yamagichi, Journal of the Ceramic Association of Japan 1966, 74, 94-100; Tsuchida and Kodaira, Journal of Materials Science 1990, 25, 4423-4426), as it involves the hydrothermal treatment of boehmite powder with the seeded growth method (i.e. adding seeds of natural diaspore to a mixture of boehmite and water and optionally a base as well) at 450° C. and 1200 bar for 35 days. This makes the overall process unattractive.

Another approach reported in the literature comprises a liquid-feed flame spray pyrolysis of nano-transition-aluminas to obtain nano-$\alpha$-$Al_2O_3$ (Laine et al. Nature Materials 2006, 5, 710-712). However, it suffers from the incomplete transformation to $\alpha$-$Al_2O_3$ and requires a long premixing (24 h milling followed by ultrasonication) of 1-10% alumina in ethanol and subsequent combustion, releasing greenhouse gas. Besides, from the perspective of applications in catalysis, minor amounts of transition alumina could be a source of catalyst deactivation due to a possible hydration as it is faced by catalysts based on transition alumina (Aad et al., ChemCatChem 2017, 9, 2106-2117).

Yet another known method involves the hydrothermal treatment of boehmite powder in water and 96.6% $H_2SO_4$ (0.3-0.4 wt.-% of $H_2O$) solution in the presence of $\alpha$-$Al_2O_3$ seeds (5-10 wt.-% of boehmite) and a morphology modifier e.g. colloidal silica (1-10 wt.-% of $\alpha$-$Al_2O_3$) at 430-450° C. and 103 bar for 6-10 days (Suchanek and Garcés, CrystEngComm 2010, 12, 2996-3002). This route provides $\alpha$-$Al_2O_3$, but the specific surface area achieved was still low (21 m²/g). Besides, the overall approach involves harsh and energy-intensive conditions.

Yet another approach available in open literature suggests the use of the high energy ball milling of nanocrystalline $\gamma$-$Al_2O_3$ to obtain $\alpha$-$Al_2O_3$ (Zieliński et al., Journal of Materials Research 1993, 8, 2985-2992). It involves the dry milling of $\gamma$-$Al_2O_3$ powders at room temperature using a hardened steel or a tungsten carbide (WC) jar with a SPEX 8000 laboratory ball mill. The $\gamma$-$Al_2O_3$ precursors of different surface area (80, 105, 208 m²/g) were investigated. In general, the surface area of all $\gamma$-$Al_2O_3$ precursors was reduced to similar extent upon milling for 6 h in hardened steel jar and balls by a reduction factor of 2.2 (surface area reduction factor=surface area before ball milling/surface area after ball milling). This factor was even higher (3.2) for WC jar and balls. Thus, for a precursor with a 208 m²/g, the maximum surface area achieved was 65 m²/g and 92 m²/g for WC and hardened steel jar and balls, respectively. However, in the latter case, the transformation of $\gamma$-$Al_2O_3$ precursor was only about 60% in 6 h, i.e. remaining $\gamma$-$Al_2O_3$ will also contribute to this surface area value. Whereas in the case WC jar and balls, which is reported to achieve full conversion in 6 h, a significant contamination of WC (24 wt.-%) was observed.

U.S. Pat. No. 5,641,469 discloses a process for at least partial conversion of $\gamma$-$Al_2O_3$ to $\alpha$-$Al_2O_3$ in presence of $\alpha$-$Al_2O_3$ seeds (at least 0.1% by weight based on total amount of $\gamma$-$Al_2O_3$) by a mechanochemical treatment sufficient to convert at least part of the gamma alumina to alpha alumina in the essential absence of water at temperatures below 100° C. The $\alpha$-$Al_2O_3$ seeds are claimed to be uniformly dispersed in the precursor $\gamma$-$Al_2O_3$ by a sol-gel seeding process. A mechanochemical treatment as mentioned was suggested to comprise dry milling for a time sufficient to convert at least about 5 wt.-% of the gamma alumina to alpha alumina. The obtained mixture was then subjected to a heat treatment at a temperature sufficient to complete the conversion of the gamma alumina to alpha alumina.

Thus, ball milling might be an approach for producing alpha alumina from gamma alumina. However, the above mentioned efforts on the mechanochemical route suffer from (1) longer milling times, which led to the contamination of milling jar and ball materials, (2) incomplete conversion of gamma alumina to alpha alumina even with the addition of seeds, which thus necessitates a post calcination step (at 1150-1200° C.) to achieve the full conversion of gamma alumina, and (3) requires a nanocrystalline $\gamma$-$Al_2O_3$ precursor with the specific surface area >250 $m^2/g$ so as to achieve $\alpha$-$Al_2O_3$ with a surface area up to 100 $m^2/g$. These issues restrict a wider application of this method.

Thus, there is a need for a suitable process for preparing nanocrystalline alpha alumina with high specific surface area under more convenient conditions of time and process characteristics.

The present invention provides a suitable mechanochemical activation process that enables the production of nanoparticulate alpha alumina by converting $\gamma$-AlOOH·$xH_2O$ with 0≤x<2 into alpha alumina nanoparticles in a particle size range of 1 to 50, preferably 1 to 30 nm, and a high specific BET surface area of at least 90 $m^2/g$, by subjecting said $\gamma$-AlOOH·$xH_2O$ to a milling process in a ball mill with a milling jar and balls in a weight ratio of balls to said $\gamma$-AlOOH·$xH_2O$ of 1 to 200, preferably 5 to 100, in a temperature range below the conversion temperature of nanocrystalline $\gamma$-AlOOH·$xH_2O$ to $\gamma$-$Al_2O_3$, preferably in a temperature range of 10 to 200° C. and for a period of time of 1 to 20 hours, preferably 1 to 10 without the need of addition of seeds. The conversion temperature of nanocrystalline $\gamma$-AlOOH·$xH_2O$ to $\gamma$-$Al_2O_3$ usually starts at about 400° C. and the conversion reaction is getting faster if the temperature increases up to 600° C., In more detail, the present invention is directed to a process of converting boehmite compounds of the formula $\gamma$-AlOOH·$xH_2O$ with 0≤x<2.0 into alpha alumina by subjecting said boehmite compounds to a milling process in a ball mill such as a vibration mill or a planetary mill with a milling jar and balls, preferably made of WC or hardened steel in a weight ratio of balls to said boehmite compounds of the formula $\gamma$-AlOOH·$xH_2O$ with 0≤x<2.0 in the range of 1 to 200, preferably in the range of 5 to 100, more preferably in the range of 10 to 100, and in a temperature range below the conversion temperature of boehmite to $\gamma$-$Al_2O_3$, preferably in a temperature range of 10 to 200° C., more preferably from 20 to 120° C., and for a period of time of 0.5 to 20, even up to 30 hours, preferably 1 to 10 hours. Thus, $\alpha$-$Al_2O_3$ obtained in the process of the present invention generally has a BET surface area of at least 90 $m^2/g$, preferably at least 100 $m^2/g$, more preferably at least 120 $m^2/g$, and even more preferably at least 130 $m^2/g$; and the particle size of the nanoparticulate alpha alumina particles obtained in the process of the present invention is in the range of 1 to 50 nm, preferably in the range of 1 to 30 nm, measured by TEM. Generally, the number average particle size distribution d50 of the nanoparticulate alpha alumina particles is in the range of 5 to 30 nm, preferably in the range of 10 to 20 nm. Nanoparticulate in the sense of the invention means that the particles have a particle size in the defined range and may comprise one or more nanocrystalline domains.

As stated above, said aluminum precursor, boehmite, used in the process of the present invention is defined by the chemical formula $\gamma$-AlOOH·$xH_2O$ with 0≤x<2.0. Thus, the boehmite compound of the present invention might have additional bound water. Boehmite with additional bound water is also called as pseudoboehmite. Thus, according to present invention pseudoboehmite could also be used to obtain the nanocrystalline alpha alumina by mechanochemical activation. The content of additional water i.e. x is preferably in the range of 0 to 0.5, more preferably in the range of 0.1 to 0.33 and most preferably in the range of 3 to 7 wt.-% of the total amount of boehmite. Said boehmite compound is generally used with a particle size in the range of 2 to 200 nm, preferably in the range of 4 to 100 nm.

The said precursor compound can be obtained by one or the other of the known methods. Such known methods could include—but are not limited to—(i) calcination of gibbsite at temperatures of up to 325° C. (Sidheswaran and Bhat, Indian Journal of Chemical Technology 1997, 4, 206-209), (ii) hydrothermal treatment of gibbsite (Santos et al., Materials Research 2009, 12, 437-445, Filho et al., Materials Research 2016, 19, 659-668), (iii) sol-gel routes (Kharat et al., Asian Journal of Chemistry 2008, 20, 915-924; Munhoz et al., Materials Science Forum 2015, 820, 131-136), or (iv) modified Bayer process of bauxite refining (Panias and Paspaliaris, Erzmetall 2003, 56, 75-81).

The said mechanochemical activation process of the present invention involves ball milling using a vibration mill, a planetary mill, or any other milling principle/method capable of effecting conversion of boehmite to alpha alumina. The milling jar and balls can be made of corundum, WC, or hardened steel or other suitable materials that are capable to achieve the purpose of the present invention. The use of corundum is advantageous as no foreign atom is then present in the jar. The milling device could be equipped with external heating device, which would allow applying heat to milling jars during milling. Besides of materials of milling jars and balls, several parameters can be tuned, such as size of jars, number and size of balls, amount of powder, frequency of milling ($f_{mill}$) etc.

Preferably, the size of the ball milling jar is chosen to allow milling of up to 5 kg boehmite or even more in a batch. The size of the balls is chosen to apply sufficient mechanical energy to the boehmite powder so that it provides $\alpha$-$Al_2O_3$ with particle size in the above-defined range. The size of the balls is usually in the range of 1 to 5 cm in diameter, preferably 1.1 to 1.7 cm, depending on the material of the balls made of WC or steel.

Preferably, the frequency of vibration in vibration mill milling or revolution per minute (rpm) in planetary mill or of other milling system is chosen to apply sufficient mechanical energy to the boehmite powder so that it provides $\alpha$-$Al_2O_3$ with particle size in the above-defined range. The frequency in vibration mill is usually >20 Hz and in planetary mill is usually >600 rpm.

The basic principles involved, but not limited to, in the above-mentioned ball milling kinds are the impact and friction mechanical forces. These forces can transfer the mechanical energy into the compound being milled which induce its reaction with a particle in its immediate vicinity transforming to new chemical or crystallographic structures. In the case of the present invention, the atomic rearrangement seems to take place transforming the boehmite phase from cubic close-packing (ccp) to alpha alumina having hexagonal close-packing (hcp) of oxygens.

In one embodiment of the present invention, the ball milling was performed in a closed jar. Under these conditions, the ball milling of the boehmite precursor of the present invention enables the complete conversion of the precursor to the alpha phase of aluminum compounds, which contain more than 70% alpha alumina and the rest being diaspore, which is defined by the chemical formula $\alpha$-AlOOH. Thus, the present invention also covers the process for converting $\gamma$-AlOOH·xH$_2$O with $0 \leq x < 2.0$ into nanoparticulate alpha alumina wherein the milling product is additionally comprising alpha AlOOH, optionally in a weight ratio of up to 30 wt.-% of the total amount of nanoparticulate alpha alumina and alpha AlOOH (diaspore).

Thus, diaspore is the crystallographic polymorph of boehmite, which can otherwise be formed from boehmite under very harsh conditions (vide supra). Since diaspore has a hexagonal close packing of its oxygens, alike $\alpha$-Al$_2$O$_3$, it can be topotactically transformed to $\alpha$-Al$_2$O$_3$ by calcining at temperatures 500-600° C. Thus, in an embodiment of the present invention, phase pure alpha $\alpha$-Al$_2$O$_3$ was achieved by calcining the mixture of alpha alumina and diaspore, obtained after ball milling of boehmite, at a temperature between 500-600° C. This provides a material having exclusively the $\alpha$-Al$_2$O$_3$ phase with a specific BET surface area greater than 100 m$^2$/g, preferably greater than 120 m$^2$/g, and more preferably greater than 130 m$^2$/g.

Alternatively, a prolonged ball milling (for 10 to 15 h, preferably of 11 to 13 h) of the boehmite precursor also converts the intermediate diaspore to alpha alumina. Thus, pure $\alpha$-Al$_2$O$_3$ from boehmite can also be obtained solely by ball milling, i.e. without need of any post heat treatment. The specific BET surface area of corundum obtained this way falls in the range defined above.

While not wishing to be limited by any theory, it is believed that when starting with boehmite precursor, the transformation to $\alpha$-Al$_2$O$_3$ appears to progress through the formation of diaspore which topotactically transforms to $\alpha$-Al$_2$O$_3$, thereby preserving high surface area. Thus, boehmite first undergoes atomic rearrangement from ccp to hcp. The latter can readily release its water and eventually ends up in $\alpha$-Al$_2$O$_3$ with similar arrangement of oxygens (i.e. hcp). Thus, for those experts in the art it is understandable that an application of heat during ball milling with a minimum temperature that enables to evolve water from the solid might lead to a faster transformation of diaspore formed in situ by ball milling of boehmite.

The inventors considered that the surface area greater than 120 m$^2$/g could not be achieved from the ball milling of nanocrystalline $\gamma$-Al$_2$O$_3$ as attempted in the literature (Zieliński et al., Journal of Materials Research 1993, 8, 2985-2992), and the inventors found out that the structural water in boehmite, which would be released upon nucleation of alpha alumina, plays a role on creating nanometer-sized alpha alumina particles during milling. According to the inventors, the released water acts as a process control agent, which helps to improve the fracture phenomenon during milling and thus creates smaller particles of a solid.

Furthermore, it was also found in the present invention that the particle size of the boehmite compounds does not have a noticeable influence on the efficiency of milling i.e. a full conversion of the boehmite precursor can be achieved by ball milling under equivalent milling conditions. This offers a great flexibility on the choice of the boehmite precursor. Preferably, the particle size of the boehmite compounds used in the present invention is in the range of 2-100 nm. After milling as defined in the description, the particle size of the obtained nanoparticulate $\alpha$-Al$_2$O$_3$ is in the range of 1 to 50 nm, preferably 1-30 nm.

According to the present invention, the quantity of additional water in boehmite (i.e. x in $\gamma$-AlOOH·xH$_2$O) is below 20 wt.-% (i.e. x~0.67, $0 \leq x < 0.67$), preferably below 15 wt.-% (i.e. x~0.5, $0.1 \leq x < 0.5$), and more preferably below 10 wt.-% (i.e. x~0.33, $0.1 \leq x < 0.33$), and most preferably a water content between 1 to 7 wt.-% , even more preferred 3 to 7 wt.-% of the total amount of boehmite. All weight percentages as used in the present invention refer to the total weight of the boehmite as used. The said quantity of additional water can be adjusted by a simple preheating of the boehmite precursors at temperatures in the range of 120-140° C. This mild temperature pre-treatment does not change the structure of the boehmite as confirmed by X-ray diffraction analysis.

Depending on the conditions of the inventive process for converting $\gamma$-AlOOH·xH$_2$O into nanoparticulate alpha alumina, a lower limit of the water content of $\gamma$-AlOOH·xH$_2$O might be given with $x \geq 0$, or preferred with $x \geq 0.1$, and a upper limit might be given with $x \leq 0.67$, preferably $x \leq 0.5$, and more preferably $x \leq 0.33$.

In a further embodiment, the present invention also refers to a process for converting $\gamma$-AlOOH·xH$_2$O with $0 \leq x < 2.0$ into nanoparticulate alpha alumina according to preceding description wherein milling is performed upon addition of a metal and/or metal compounds wherein the metal is selected from transition metals, main group metals or mixtures thereof. The metal may preferably be selected from Ti, V, Cr, Mn, Fe, Co, Ni, Cu, Zn, Mo, Se, Sn, Pt, Ru, Rh, Zr, Hf, Re, Pd, W, Ir, Os, Rh, Nb, Ta, Pb, Bi, Au, Ag, Sc, Y, Ce, Pr, Nd, Eu. Preferably, said metal or metal compound is used in particulate form. The metal compound is preferably selected from halides, pseudohalides, nitrates, acid salts, oxides. In this embodiment, the BET surface area of the obtained nanoparticulate alpha alumina loaded with metal may be smaller compared to the same nanoparticulate alpha alumina in the unloaded form.

It was observed that when the milling jar and milling balls made of WC were used, the sample after ball milling was found to contain WC up to 7 wt.-%. The latter could come from the abrasion of WC vial and balls during milling. Thus, when alpha alumina free of WC is desired, WC can be removed by known chemical methods (Archer et al., Journal of Analytical Atomic Spectrometry 2003, 18, 1493-1496). For example, WC can be selectively oxidized in an oxidizing solution of HNO$_3$ and H$_2$O$_2$ to tungstic acid and carbon dioxide (Equation 3).

$$WC + (O) \rightarrow WO_3 \cdot H_2O \text{ or } H_2WO_4 + CO_2 \qquad \text{(Eq. 3)}$$

Alternatively, the separation might also be possible by methods relying on different densities or wetting behavior, such as sedimentation or flotation.

The process of the present invention is further elaborated in more details through drawings and examples. However, they do not limit the scope of the invention and only intended for the purposes of illustration.

The invention is further illustrated by the following Figures. In the Figures, it is shown:

FIG. 1: PXRD patterns of (a) boehmite of $d^{Scherrer}$=17 nm (denoted as γ-AlOOH-17), (b) γ-AlOOH-17 after 3 h ball milling, (c) γ-AlOOH-17 after 12 h ball milling, and (d) after post-calcination of 3 h ball milled γ-AlOOH-17 at 550° C. in static air for 10 h. The crystalline phases identified in the samples are indicated on the corresponding diffractograms (B=boehmite, γ-AlOOH, ICDD PDF 21-1307; D=diaspore, α-AlOOH, ICDD PDF 05-0355; α=corundum, α-Al$_2$O$_3$, ICDD PDF 46-1212). Milling conditions: Vibration mill with WC jar and WC balls, milling time=3-12 h, bpr=40.5, $f_{mill}$=25 Hz.

Figure 2:
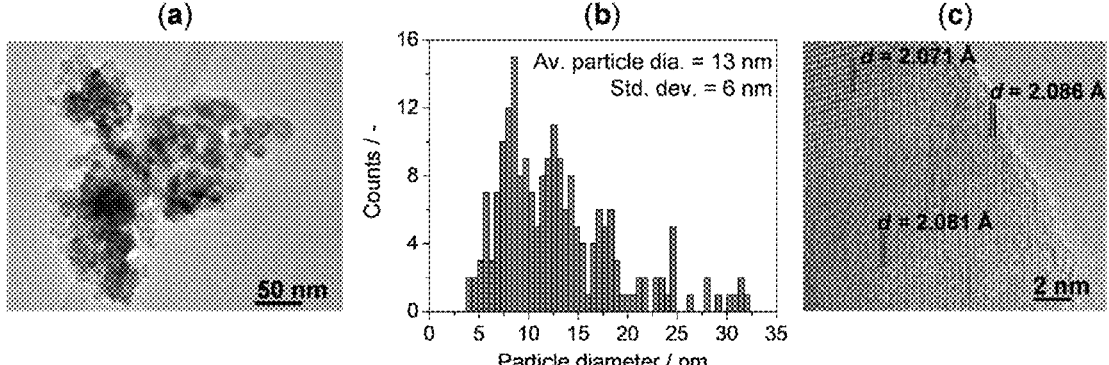

FIG. 2: (a) TEM, (b) particle size distribution, and (c) HRTEM of nanocrystalline alpha alumina obtained by 3 h ball milling of γ-AlOOH-17 followed by post-calcination at 550° C. in static air for 10 h.

Figure 3:
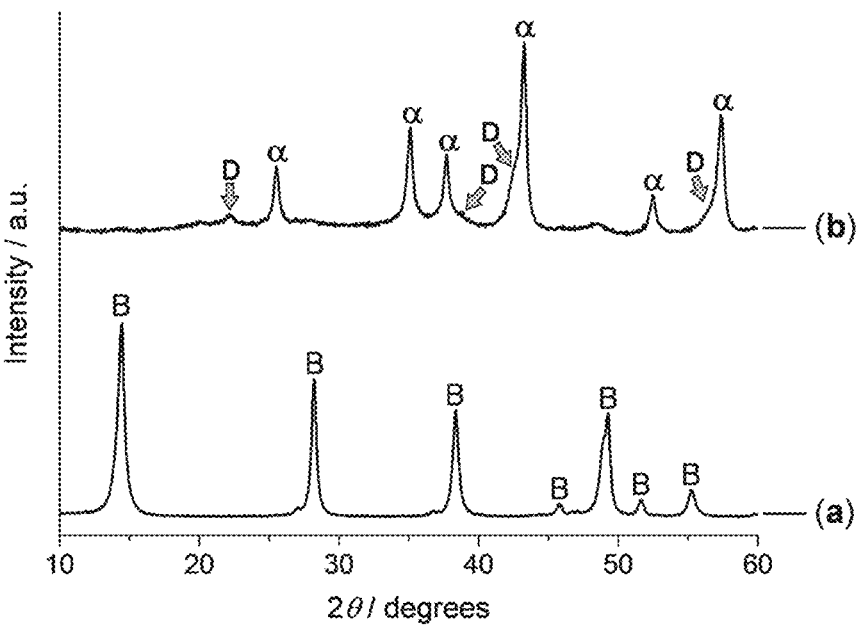

FIG. 3: PXRD patterns of the boehmite sample described in the caption of FIG. 1(*a*) before and (*b*) after ball milling under the same conditions as in the caption of FIG. 1, except at lower bpr of 27. The crystalline phase identification is as provided in the caption of FIG. 1.

Figure 4:
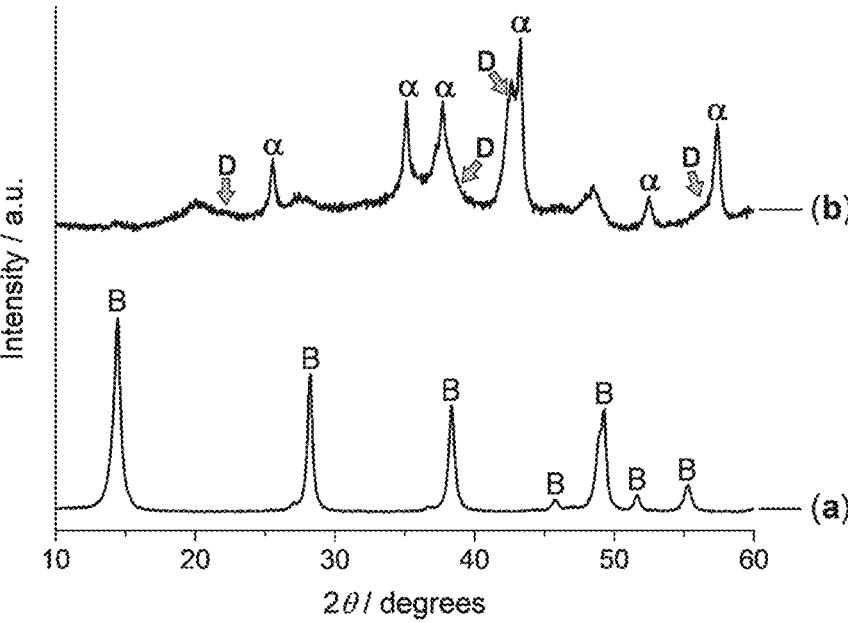

FIG. 4: PXRD patterns of the boehmite sample described in the caption of FIG. 1(*a*) before and (*b*) after ball milling under the same conditions as in the caption of FIG. 1, except at lower bpr of 27.6 and using steel milling balls. The crystalline phase identification is as provided in the caption of FIG. 1, except unmarked reflection due to iron-containing phases.

Figure 5:
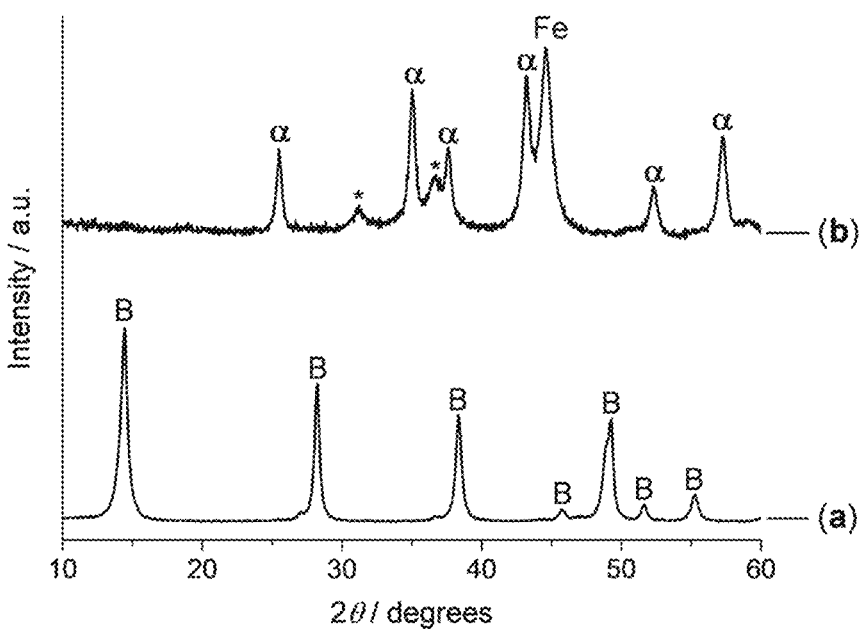

FIG. 5: PXRD patterns of the boehmite sample described in the caption of FIG. 1(*a*) before and (*b*) after ball milling in planetary mill. The crystalline phases identified in the samples are indicated on the corresponding diffractograms (B=boehmite, γ-AlOOH, ICDD PDF 21-1307; α=corundum, α-Al$_2$O$_3$, ICDD PDF 46-1212; Fe=metallic Fe, ICDD PDF 06-0696; *=Fe$_3$O$_4$, magnetite, ICDD PDF 26-1136). Milling conditions: Planetary mill with steel jar and steel balls, milling time=3 h, bpr=41.4, rpm=650.

Figure 6:
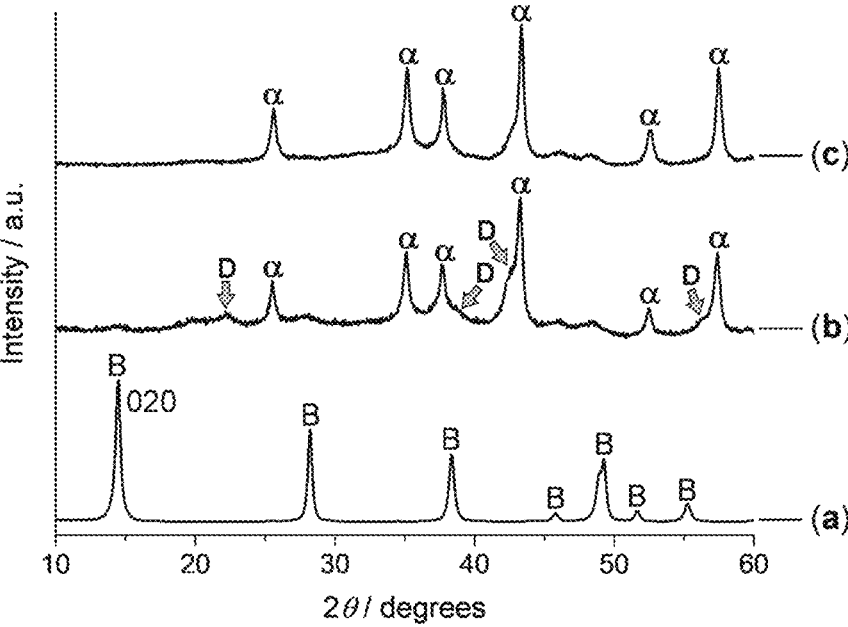

FIG. 6: PXRD patterns of (a) boehmite of $d^{Scherrer}$=20 nm (denoted as γ-AlOOH-20), (b) γ-AlOOH-20 after 3 h ball milling under the same conditions as in the caption of FIG. 1, and (c) 3 h ball milled γ-AlOOH-20 after post-calcination at 550° C. in static air for 10 h. The crystalline phase identification is as provided in the caption of FIG. 1.

Figure 7:
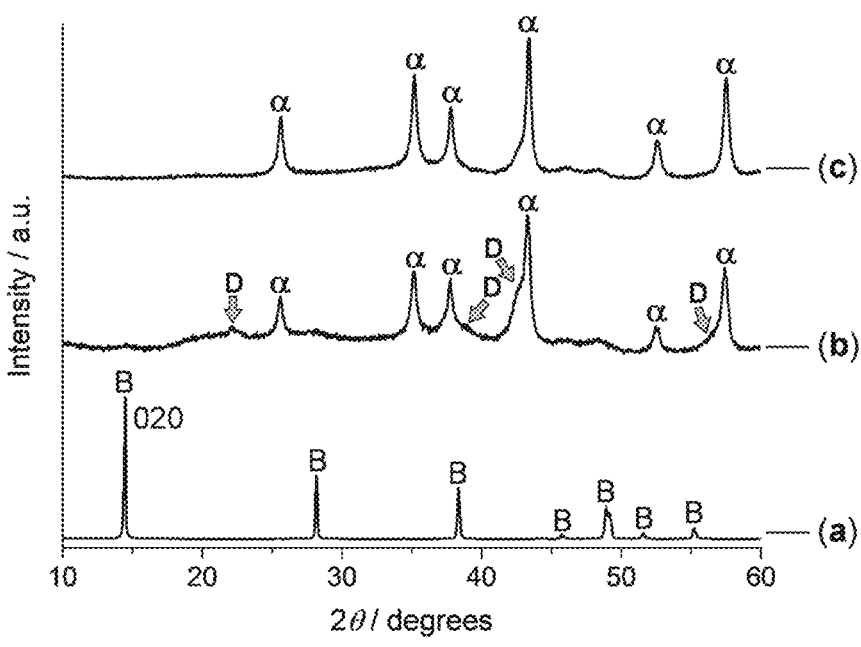

FIG. 7: PXRD patterns of (a) boehmite of $d^{Scherrer}$=52 nm (denoted as γ-AlOOH-52), (b) γ-AlOOH-52 after 3 h ball milling under the same conditions as in the caption of FIG. 1, and (c) 3 h ball milled γ-AlOOH-52 after post-calcination at 550° C. in static air for 10 h. The crystalline phase identification is as provided in the caption of FIG. 1.

Figure 8:
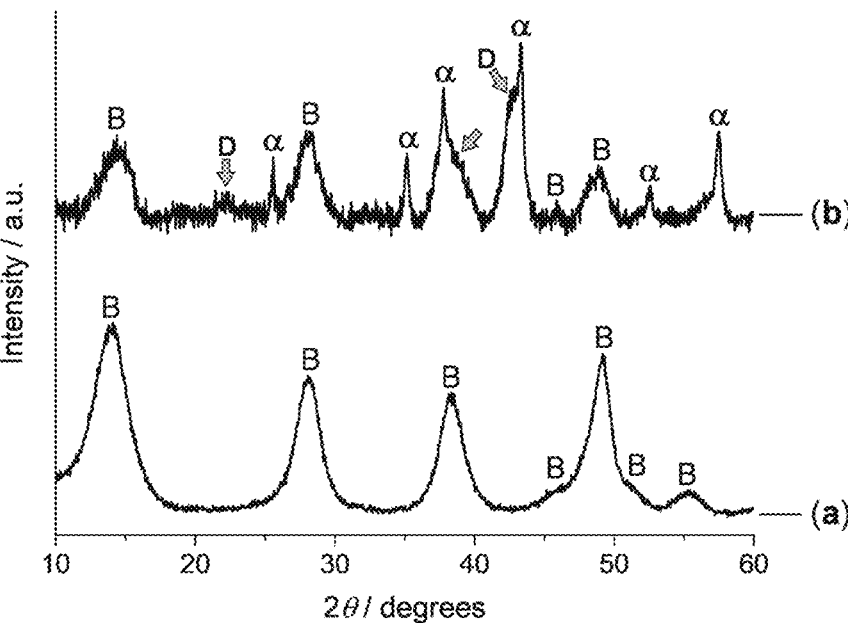

FIG. 8: PXRD patterns of boehmite of $d^{Scherrer}$=4 nm (denoted as γ-AlOOH-4) (a) before and (b) after 3 h ball milling under the same conditions as in the caption of FIG. 1. The crystalline phase identification is as provided in the caption of FIG. 1.

Figure 9:
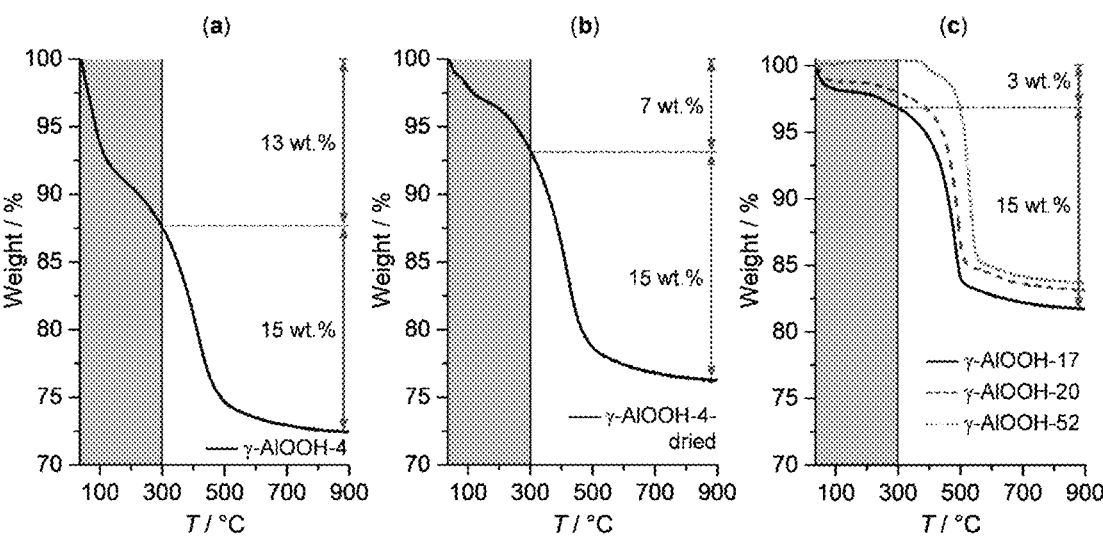

FIG. 9: Thermogravimetric analysis of boehmite compounds described in Examples 1 through 8. (a) γ-AlOOH-4, (b) γ-AlOOH-4 after drying at 140° C. in static air for 12 h (denoted as γ-AlOOH-4-dried), and (c) γ-AlOOH-17, γ-AlOOH-20, and γ-AlOOH-52.

Figure 10:
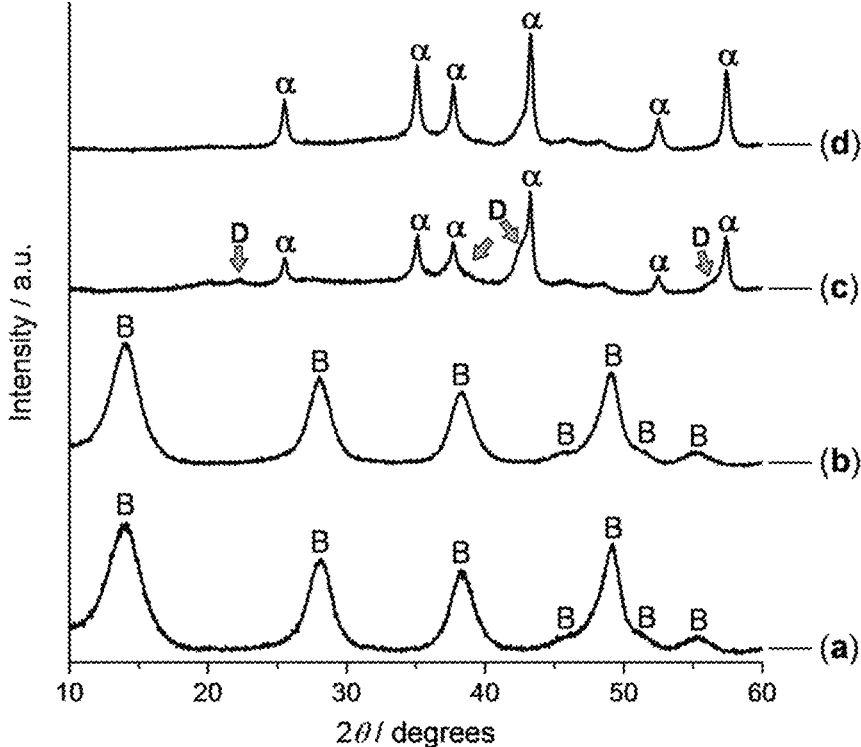

FIG. 10: PXRD patterns of (a) γ-AlOOH-4, (b) γ-AlOOH-4 after drying at 140° C. in static air for 12 h (denoted as γ-AlOOH-4-dried), (c) γ-AlOOH-4-dried after 3 h ball milling under the same conditions as in the caption of FIG. 1, and (d) 3 h ball milled γ-AlOOH-4-dried after post-calcination at 550° C. in static air for 10 h. The crystalline phase identification is as provided in the caption of FIG. 1.

Figure 11:
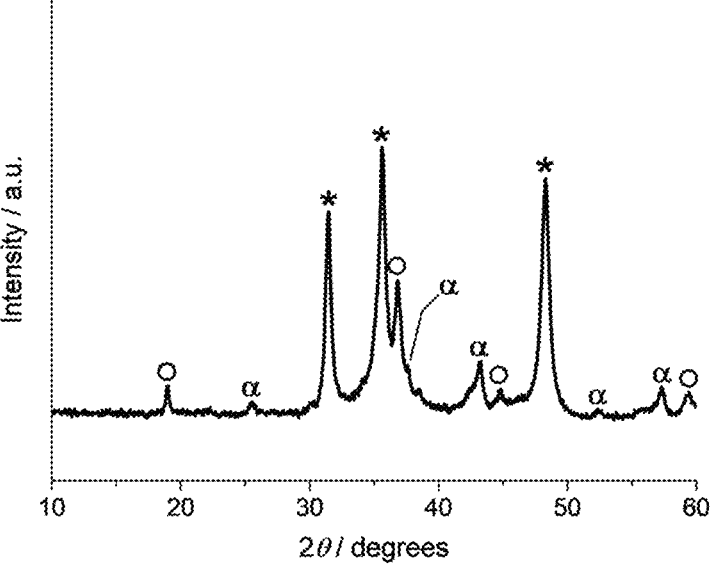

FIG. 11: PXRD pattern of α-Al$_2$O$_3$ supported cobalt oxide catalyst obtained by ball milling γ-AlOOH-17 and Co$_3$O$_4$ under the same conditions as in the caption of FIG. 1. The crystalline phases identification is as provided in the caption of FIG. 1, except ◯=Co$_3$O$_4$, ICDD PDF 42-1467; *=WC, ICDD PDF 51-0939.

Figure 12:
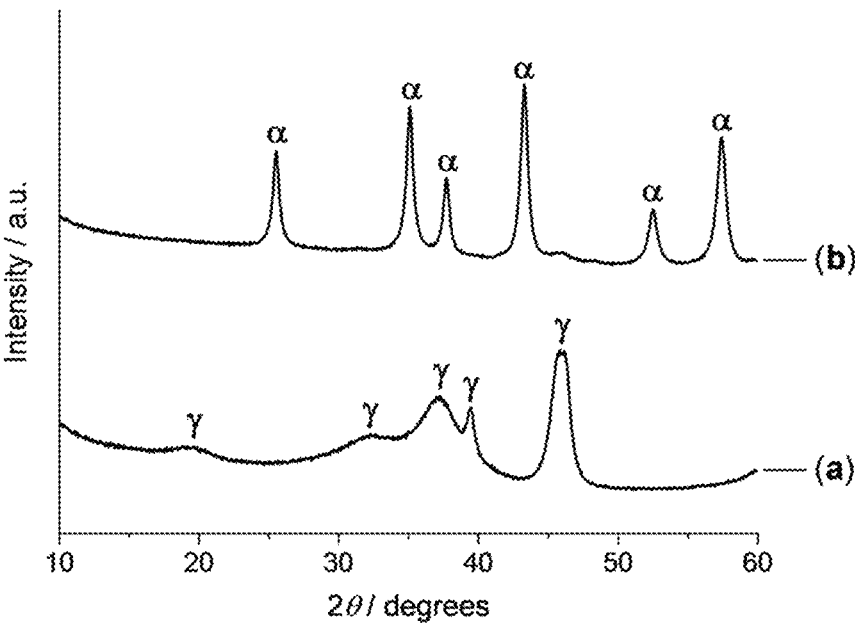

FIG. 12: PXRD patterns of (a) γ-Al$_2$O$_3$ derived by calcination of γ-AlOOH-17 at 550° C. in static air for 5 h (denoted as γ-Al$_2$O$_3$-17) and (b) γ-Al$_2$O$_3$-17 after ball milling under the same conditions as in the caption of FIG. 1. The crystalline phases identified in the samples are indicated on the corresponding diffractograms (γ=γ-Al$_2$O$_3$, ICDD PDF 50-0741; α=corundum, α-Al$_2$O$_3$, ICDD PDF 46-1212). This figure is of a comparative example.

Figure 13:
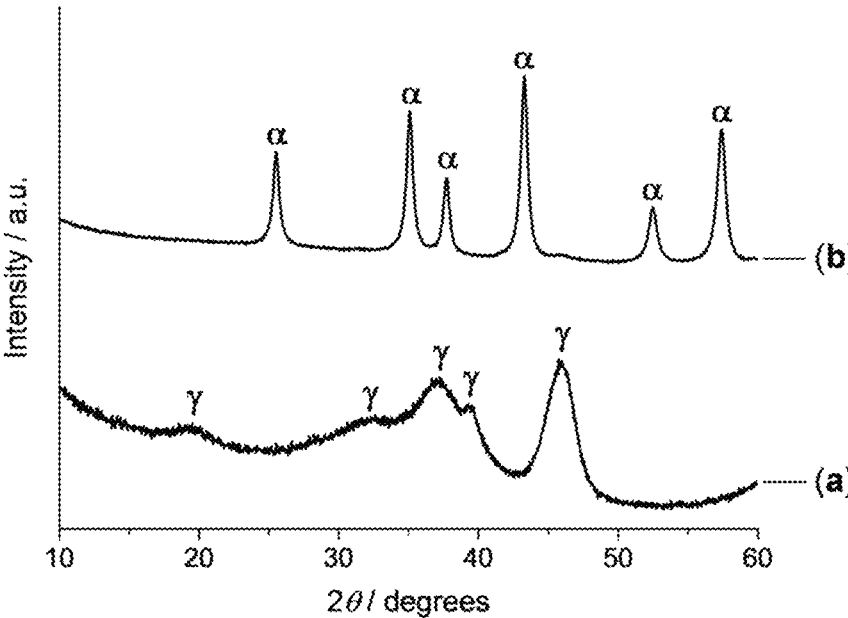

FIG. 13: PXRD patterns of (a) γ-Al$_2$O$_3$ derived by calcination of γ-AlOOH-4 at 550° C. in static air for 5 h (denoted as γ-Al$_2$O$_3$-4) and (b) γ-Al$_2$O$_3$-4 after ball milling under the same conditions as in the caption of FIG. 1. The crystalline phases identified in the samples are indicated on the corresponding diffractograms (γ=γ-Al$_2$O$_3$, ICDD PDF 50-0741; α=corundum, α-Al$_2$O$_3$, ICDD PDF 46-1212). This figure is of a comparative example.

METHODS

Ball Milling

The ball milling experiments were performed using a Retsch® Mixer Mill MM400, which involves a horizontal vibration motion at a set frequency (herein referred as vibration mill), having two milling jars (25 cm$^3$) made of either WC or stainless steel. The material of milling balls used is also either WC (ball diameter, $d_{ball}$=1.2 cm) or stainless steel ($d_{ball}$=1.5 cm). The ball milling experiments were also performed using a Fritsch Pulverisette, which involves a planetary motion to achieve a high-energy input (herein referred as planetary mill). It is equipped with two milling jars (45 cm$^3$) made of stainless steel. The material of milling media was also stainless steel. In a typical experiment, the milling jar is filled with a precursor powder(s) and milling balls at a desired bpr (defined in Equation 4) in an open environment and placed in the vibration or planetary mill after properly closing, followed by setting the milling frequency ($f_{mill}$) for vibration mill or revolutions per minute (rpm) for planetary mill and duration and starting the milling experiment.

$$bpr = \frac{\text{total weight of all balls used}}{\text{weight of powder}} \qquad \text{(Eq. 4)}$$

where: bpr is ball to powder ratio.

WC Removal from the Ball Milled Sample

The appearance of the sample after ball milling in vibration mill was light gray to gray due to the abrasion of WC vial and balls during milling. The tungsten content in the sample, as determined by EDX analysis, after 3 h ball milling was less than 7 wt.-%. As WC has a strong absorption in PXRD, it complicates the identification of other phases present in the sample. Thus, it was removed from the sample, for the accurate characterization purpose, by adapting a literature method (Archer et al., Journal of Analytical Atomic Spectrometry 2003, 18, 1493-1496). In a typical WC removal method adapted in the present invention, one gram ball milled sample was dispersed in 30 cm$^3$ solution of 5% HNO$_3$ in 30% H$_2$O$_2$ in a round-bottom (RB) flask. The latter was attached to the condenser, slowly heated to 80° C., and stirred at this temperature for 1-2 minutes. The heating bath is removed and the sample was allowed to stand at room temperature for 30 minutes. The white (whitish) solid was separated by centrifugation and dried at 70° C. for 12 h. This treatment did not cause any change in the crystallinity of the sample or on the textural properties as confirmed by the powder X-ray diffraction and N$_2$ physisorption analyses of the sample before and after the treatment.

N$_2$ Physisorption

N$_2$ physisorption at −196° C. was carried out using a Micromeritics 3Flex Surface Characterization Analyzer. The samples were evacuated at 140° C. for 12 h prior to the measurement. The specific surface area (S$_{BET}$) was calculated from the adsorption data in the relative pressure range of 0.05 to 0.3 using the Brunauer-Emmett-Teller (BET) method (Brunauer et al., Journal of the American Chemical Society 1938, 60, 309-319).

Thermogravimetric Analysis

Thermogravimetric analysis (TGA) was performed in a NETZSCH STA 449 F3 Jupiter® analyzer connected to a NETZSCH QMS 403 D Aëolos® quadrupole mass spectrometer gas analysis system. Analyses were performed in Ar (40 cm$^3$ STP per min). About 15 mg of sample was placed in the sintered alumina crucible and the temperature was raised from 40° C. to 900° C. at 10° C./min. Throughout the temperature ramp, atomic mass unit (AMU) 18 (H$_2$O) was monitored; in addition, full scans over the whole mass range were performed at different temperatures.

Energy-Dispersive X-Ray Spectroscopy

Energy-dispersive X-ray spectroscopy (EDX) analysis was performed on a Hitachi S-3500N instrument. The microscope was equipped with a Si(Li) Pentafet Plus detector from Texas Instruments.

Particle Size Measurement

Transmission Electron Microscopy

Transmission electron microscopy (TEM) and high resolution (HR) TEM images were recorded using a Hitachi HF-2000 microscope with a cold field-emission cathode at maximum acceleration voltage of 200 kV. Samples were prepared by sprinkling dry specimen on the TEM grid consisting of a lacy carbon film supported by a copper grid. Particle size distribution was determined by measuring the diameters of more than 200 particles from several TEM images of the same sample. The number average particle size (d50) was calculated by adding the measured diameters of all particles together and dividing by the number of particles measured. The d50 was used as Sauter mean diameter (SMD, d$_{32}$) to estimate the surface area based on particle size using the Equation 5 (Sauter, VDI-Forschungsheft Nr. 279 (1926) and Nr. 312 (1928) ISSN 0042-174X; Wang and Fan, Ch. 2, pp 42-76 in Woodhead Publishing Series in Energy (2013) ISBN 9780857095411).

$$\text{Nanoparticle surface area} = \frac{6}{d_{32} \cdot \rho} \qquad \text{(Eq. 5)}$$

where: d$_{32}$ is the Sauter mean diameter, which is defined as an average of particle size, and ρ is the density of the powder.

Powder X-Ray Diffraction

Powder X-ray diffraction (PXRD) was measured using a Stoe STADI P diffractometer operating in reflection mode with Cu Kα radiation. Data were recorded in the 10-70° 2θ range with an angular step size of 0.04°. The average particle size was also determined from diffractograms (denoted by d$^{Scherrer}$) by applying the Scherrer equation (Equation 6) to the three most intense reflections and taking the average of the obtained values. Thus, for boehmite starting materials, reflections centered at 2θ 14.4, 28.2, and 38.3; and for α-Al$_2$O$_3$ samples, reflections centered at 2θ 35.2, 43.3, and 57.4 were used for the Scherrer determination.

$$d^{Scherrer} = \frac{K \cdot \lambda}{\beta \cdot \cos\theta} \qquad \text{(Eq. 6)}$$

where: d$^{Scherrer}$ is the average size of the crystalline domains,

K is a dimensionless shape factor (0.9),

λ is the X-ray wavelength used to irradiate the sample (i.e. in this case of Cu X-rays, it was 1.5406 Angstroms), θ is the Bragg angle determined from the respective reflection, and β is the line broadening at half the maximum intensity (FWHM), determined according to the Equation 7:

$$\beta = \left(\beta_{sample}^2 - \beta_{instrument}^2\right)^{0.5} \qquad \text{(Eq. 7)}$$

where: β$_{sample}$ is the FWHM of the corresponding reflection used to determine the average crystallite size and β$_{instrument}$ is the FWHM of the due to instrument determined using NIST Si standard The invention is further illustrated by the following Examples.

EXAMPLES

Example 1

Boehmite of d$^{Scherrer}$=17 nm (denoted as γ-AlOOH-17) was obtained from Sasol. One gram of γ-AlOOH-17 was charged in the WC milling vial together with WC milling balls to achieve a bpr of 40.5. The milling vial was placed in the vibration mill and the ball milling was performed in the closed environment for 3-12 h. After the experiment the powder was removed from the vial and subjected for WC removal, followed by characterization by PXRD, N$_2$ physisorption, and TEM/HRTEM analysis.

The PXRD analysis (FIG. 1) evidenced the full transformation of the boehmite phase in the precursor (a) after 3 h ball milling (b). Based on PXRD phase analysis, the ball milled sample was composed of more than 70% α-Al$_2$O$_3$ and the remaining being α-AlOOH (diaspore) as can be seen from the relative intensity of the corresponding reflections. The S$_{BET}$ of the starting boehmite was 89 m$^2$/g and after 3 h ball milling the S$_{BET}$ of 125 m$^2$/g was obtained. The PXRD analysis of $\gamma$-AlOOH-17 sample after 12 h ball milling showed the presence of solely $\alpha$-$Al_2O_3$ (FIG. 1c). The $S_{BET}$ of this sample was determined to be 116 $m^2$/g.

A part of the 3 h ball milled sample after WC removal was subjected to calcination at 550° C. (2° C./min) in static air for 10 h. The calcination fully transformed the remaining diaspore to $\alpha$-$Al_2O_3$, producing the material with sole desired $\alpha$-$Al_2O_3$ phase (FIG. 1d). The $S_{BET}$ of the calcined sample was 120 $m^2$/g. TEM image of this sample showed rounded particles in the range of 4-32 nm with TEM-based number average particle size, d50, of 13 nm (std. dev.=6 nm) (FIG. 2a, b). Using this d50 in Equation 5, the nanoparticle surface area was calculated to be 118 $m^2$/g (based on density of alpha alumina of 3.9 $g/cm^3$). This matches very well with the BET surface area of 120 $m^2$/g reported above for this sample. Furthermore, application of Scherrer equation to the diffractogram of this sample, according to the procedure described in methods, provided $d^{Scherrer}$=18 nm. The high resolution TEM analysis evidenced a crystalline nature of the sample also at the surface (FIG. 2c). Determination of d spacing at different areas provided an average value of 2.079 Å, which is similar to 2.085 Å for 113 plane of $\alpha$-$Al_2O_3$.

Example 2

The ball milling experiment was performed under the same conditions and using the precursor as described in Example 1, except at lower bpr (reduced number of WC balls).

The PXRD analysis evidenced the full transformation of the boehmite phase in the precursor after 3 h ball milling (FIG. 3). Based on PXRD phase analysis, the ball milled sample was composed of $\alpha$-$Al_2O_3$ as the predominant phase with minor $\alpha$-AlOOH, like in Example 1. The surface area of the ball milled powder was 110 $m^2$/g.

Example 3

The ball milling experiment was performed under the same conditions and using the precursor as described in Example 1, except at lower bpr and using steel balls.

The PXRD analysis evidenced the full transformation of the boehmite phase in the precursor after 3 h ball milling (FIG. 4). Based on PXRD phase analysis, the ball milled sample was composed of $\alpha$-$Al_2O_3$ as the predominant phase with minor $\alpha$-AlOOH, like in Example 2. The sample was additional composed of iron-based phases, which originated from the abrasion of steel balls during milling. The content of iron as determined by EDX analysis was 1.5 wt.-%. The surface area of the ball milled powder was 108 $m^2$/g.

Example 4

The ball milling experiment was performed using the precursor as described in Example 1 in planetary ball mill using milling jar and balls made of steel.

The PXRD analysis evidenced the full transformation of the boehmite phase in the precursor after 3 h ball milling to $\alpha$-$Al_2O_3$ (FIG. 5). No $\alpha$-AlOOH formation found in this case. The iron content in the sample was 22 wt.-% as determined by EDX. The $S_{BET}$ after correction for iron content was 105 $m^2$/g and $d^{Scherrer}$=18 nm.

Example 5

Boehmite of $d^{Scherrer}$=20 nm (denoted as $\gamma$-AlOOH-20) was prepared by a hydrothermal treatment of aluminum hydroxide (Al(OH)$_3$, Sigma-Aldrich) adapting a literature method (Santos et al., Materials Research 2009, 12, 437-445, Filho et al., Materials Research 2016, 19, 659-668). In a typical synthesis, aluminum hydroxide was dispersed in deionized water in a molar Al:$H_2O$ ratio of 50 in a Teflon-lined autoclave. The hydrothermal nucleation of boehmite was achieved by heating the above-prepared autoclave to 200° C. and holding at this temperature for 72 h under autogenous pressure. The white solid was recovered by centrifugation, followed by drying in flowing air at 70° C. for 12 h. The formation of phase pure boehmite was confirmed by PXRD (FIG. 6a), with $d^{Scherrer}$=20 nm.

The above sample was ball milled under the same conditions as in Example 1.

The PXRD analysis evidenced the full transformation of the boehmite phase in this precursor after 3 h ball milling (FIG. 6a, b). Based on PXRD phase analysis, the ball milled sample was composed of more than 70% $\alpha$-$Al_2O_3$ and the remaining being $\alpha$-AlOOH as can be seen from the relative intensity of the corresponding reflections. The $S_{BET}$ of the starting boehmite was 64 $m^2$/g and after ball milling the $S_{BET}$ of 115 $m^2$/g was obtained.

Like in Example 1, a part of the ball milled sample after WC removal was subjected to calcination at 550° C. (2° C./min) in static air for 10 h. The calcination fully transformed the remaining diaspore to $\alpha$-$Al_2O_3$, producing the material with sole desired $\alpha$-$Al_2O_3$ phase (FIG. 6c). The $S_{BET}$ of the calcined sample was 136 $m^2$/g and $d^{Scherrer}$=18 nm.

Example 6

Boehmite of $d^{Scherrer}$=52 nm (denoted as $\gamma$-AlOOH-52) was prepared by a hydrothermal treatment of aluminum hydroxide hydrate (Al(OH)$_3$·$xH_2O$, Sigma-Aldrich) using the equivalent procedure as used in Example 5. The formation of phase-pure boehmite was confirmed by PXRD (FIG. 7a), with $d^{Scherrer}$=52.

The above sample was ball milled under the same conditions as in Example 1.

The PXRD analysis evidenced the full transformation of the boehmite phase in this precursor after 3 h ball milling (FIG. 7a, b). Based on PXRD phase analysis, the ball milled sample was composed of more than 70% $\alpha$-$Al_2O_3$ and the remaining being $\alpha$-AlOOH as can be seen from the relative intensity of the corresponding reflections. The $S_{BET}$ of the starting boehmite was 10 $m^2$/g and after ball milling the $S_{BET}$ of 103 $m^2$/g was obtained.

Like in Example 1, a part of the ball milled sample after WC removal was subjected to calcination at 550° C. (2° C./min) in static air for 10 h. The calcination fully transformed the remaining diaspore to $\alpha$-$Al_2O_3$, producing the material with sole desired $\alpha$-$Al_2O_3$ phase (FIG. 7c). The $S_{BET}$ of the calcined sample was 130 $m^2$/g and $d^{Scherrer}$=19 nm.

Example 7

Boehmite of $d^{Scherrer}$=4 nm (denoted as $\gamma$-AlOOH-4) was obtained from Sasol. This sample was ball milled under the same conditions as detailed in Example 1. After the experiment the powder was removed from the vial and subjected for WC removal, followed by characterization by PXRD.

The PXRD analysis (FIG. 8) evidenced that the boehmite is not fully transformed after 3 h ball milling. The ball milled sample was composed of three phases, unconverted boehmite precursor, intermediate diaspore phase, and $\alpha$-$Al_2O_3$.

Example 8

The boehmite precursor in Example 7 (i.e. $\gamma$-AlOOH-4) was subjected to drying at 140° C. in static air for 12 h. The obtained sample was denoted as $\gamma$-AlOOH-4-dried. This drying step enabled to reduce the additional water content in $\gamma$-AlOOH-4 as this might have effect on the efficiency of milling as observed in Example 7. The TGA analysis of the dried sample evidenced a reduced loss of additional water (7 wt.-%, see shaded area in FIG. 9b) compared to 13 wt.-% in the undried sample (FIG. 9a). The content of additional water in $\gamma$-AlOOH-17, $\gamma$-AlOOH-20, and $\gamma$-AlOOH-52 was up to 3 wt.-% (FIG. 9c). The drying procedure did not change the crystallinity of the sample as evidenced by its PXRD (FIG. 10, see a, b).

The dried sample was ball milled under the same conditions as detailed in Example 1. After the experiment, the powder was removed from the vial and subjected for WC removal, followed by characterization by PXRD.

The PXRD analysis evidenced the full transformation of $\gamma$-AlOOH-4-dried after 3 h ball milling (FIG. 10c). Based on PXRD phase analysis, the ball milled dried sample was composed of more than 70% $\alpha$-$Al_2O_3$ and the remaining was $\alpha$-AlOOH as can be seen from the relative intensity of the corresponding reflections. The $S_{BET}$ of the starting boehmite was 365 $m^2$/g and after ball milling the $S_{BET}$ of 132 $m^2$/g was obtained.

Like in Example 1, a part of the ball milled sample after WC removal was subjected to calcination at 550° C. (2° C./min) in static air for 10 h. The calcination fully transformed the remaining diaspore to $\alpha$-$Al_2O_3$, producing the material with sole desired $\alpha$-$Al_2O_3$ phase (FIG. 10d). The $S_{BET}$ of the calcined sample was 140 $m^2$/g and $d^{Scherrer}$=19 nm.

Example 9

The ball milling experiment was performed under the same conditions and using the precursor boehmite as described in Example 1, except $Co_3O_4$ (Aldrich) was added to the milling jar together with $\gamma$-AlOOH-17 in an amount 15 wt.-% of Co calculated to the amount of alumina.

The PXRD analysis (FIG. 11) evidenced the presence of alpha $Al_2O_3$ and $Co_3O_4$ phases. WC was also additionally present in this sample as this sample was not subjected to WC removal. The $S_{BET}$ of the sample was 90 $m^2$/g and $d^{Scherrer}$ of $Co_3O_4$ obtained by the application of Scherrer equation to 311 crystal plane ($2\theta$=36.8) was 10 nm. The content of Co was 15 wt.-% according to EDX analysis.

Comparative Example A

For comparison purpose boehmite precursor in Example 1 (i.e. $\gamma$-AlOOH-17) was calcined at 550° C. (1° C./min) in static air for 5 h. This pretreatment transformed $\gamma$-AlOOH-17 to $\gamma$-$Al_2O_3$ (see line (a) in FIG. 12). The latter sample is denoted as $\gamma$-$Al_2O_3$-17 and has the $S_{BET}$ of 109 $m^2$/g. This sample was used as the precursor for comparative ball milling experiment under the same conditions as detailed in Example 1.

The PXRD analysis (see line (b) in FIG. 12) evidenced the full transformation of $\gamma$-$Al_2O_3$-17 to $\alpha$-$Al_2O_3$ after 2 h ball milling. The $S_{BET}$ of the obtained sample was 64 $m^2$/g.

Comparative Example B

For yet another comparison purpose boehmite precursor in Example 9 (i.e. $\gamma$-AlOOH-4) was calcined at 550° C. (1° C./min) in static air for 5 h. This pretreatment transformed $\gamma$-AlOOH-4 to $\gamma$-$Al_2O_3$ (see line (a) in FIG. 13). The latter sample is denoted as $\gamma$-$Al_2O_3$-4 and has the $S_{BET}$ of 258 $m^2$/g. This sample was used as the precursor for comparative ball milling experiment under the same conditions as detailed in Example 1.

The PXRD analysis (see line (b) in FIG. 13) evidenced the full transformation of $\gamma$-$Al_2O_3$-4 to $\alpha$-$Al_2O_3$ after 2 h ball milling. The $S_{BET}$ of the obtained sample was 86 $m^2$/g.

The invention claimed is:

1. A method comprising:
   (a) preparing a high-surface area nanoparticulate alpha alumina, having a BET surface area of at least 130 $m^2$/g and having a particle size in the range of 1 to 50 nm measured by TEM, by a process comprising subjecting a precursor consisting of (A) $\gamma$-AlOOH·$xH_2O$ with x in the range of 0.1≤x≤0.5 and optionally (B) a metal and/or a metal compound to a milling process in a ball mill with a milling jar and balls in a weight ratio of balls to said $\gamma$-AlOOH·$xH_2O$ of 1 to 200 in a temperature range below the conversion temperature of nanocrystalline $\gamma$-AlOOH·$xH_2O$ to $\gamma$-$Al_2O_3$ to yield said high-surface area nanoparticulate alpha alumina as a milling product; and
   (b) using the high-surface area nanoparticulate alpha alumina prepared as catalyst or catalyst support for metal catalysts or in ceramics applications.

* * * * *